United States Patent [19]

Niwa et al.

[11] Patent Number: 4,743,684
[45] Date of Patent: May 10, 1988

[54] REACTIVE PHTHALOCYANINE DYES

[75] Inventors: Toshio Niwa, Kanagawa; Kiyoshi Himeno, Fukuoka; Toshio Hihara; Kanzi Shimizu, both of Kanagawa, all of Japan

[73] Assignee: Mitsubishi Chemical Industries, Tokyo, Japan

[21] Appl. No.: 766,312

[22] Filed: Aug. 16, 1985

[30] Foreign Application Priority Data

Aug. 16, 1984 [JP]  Japan ................................. 59-170741

[51] Int. Cl.$^4$ ............................................. C09B 47/04
[52] U.S. Cl. .................................................. 540/126
[58] Field of Search ......................................... 540/126

[56] References Cited

U.S. PATENT DOCUMENTS

| | | | |
|---|---|---|---|
| 4,213,757 | 7/1980 | Ruske et al. | 8/518 |
| 4,246,174 | 1/1981 | Groll | 540/126 X |
| 4,267,107 | 5/1981 | Groll et al. | 540/126 |
| 4,268,267 | 5/1981 | Duchardt et al. | 540/126 X |
| 4,330,469 | 5/1982 | Gati et al. | 540/126 |
| 4,369,549 | 8/1983 | Nakamatsu et al. | 540/126 |
| 4,505,714 | 3/1985 | Omura et al. | 540/126 X |

FOREIGN PATENT DOCUMENTS

| | | |
|---|---|---|
| 0014318 | 8/1980 | European Pat. Off. . |
| 2904551 | 10/1980 | Fed. Rep. of Germany . |
| 1208553 | 10/1970 | United Kingdom . |
| 2034740 | 6/1980 | United Kingdom . |

Primary Examiner—Richard L. Raymond
Attorney, Agent, or Firm—Sughrue, Mion, Zinn, Macpeak & Seas

[57] ABSTRACT

A reactive phthalocyanine dye having a specific substituent capable of dyeing cellulose fibers or a mixed fibers of polyester fibers and cellulose fibers to provide Turkish blue-dyed fibers excellent in color fastness to light and color fastness to washing is disclosed, which is represented by general formula [I]

$$[Pc]\begin{matrix}(SO_2N\begin{matrix}R^1\\ \\R^2\end{matrix})_n-\!\!\!\underset{N}{\overset{\displaystyle X}{\underset{\displaystyle \|}{C}}}\!\!-\!\!\underset{\|}{\overset{\|}{N}}\\ -(A)-(B)-\underset{N}{\overset{\|}{C}}\!\!-\!\!(\underset{\displaystyle Y}{\overset{\displaystyle \|}{N}})_m\\ -SO_2N\begin{matrix}\\R^3\end{matrix}\\ \\ (SO_3^{\ominus}Z^{\oplus})_l\end{matrix} \quad [I]$$

20 Claims, No Drawings

REACTIVE PHTHALOCYANINE DYES

FIELD OF THE INVENTION

This invention relates to phthalocyanine dyes, which are utilized as Turkish blue dyes.

BACKGROUND OF THE INVENTION

Hitherto, as dyes for dyeing mixed fibers of polyester fibers and cellulose fibers to provide Turkish blue-dyed mixed fibers, the dyes shown by the following formula are known as described in Japanese Patent Application (OPI) No. 24,489/78. (The term (OPI) as used herein refers to "published unexamined Japanese patent application".)

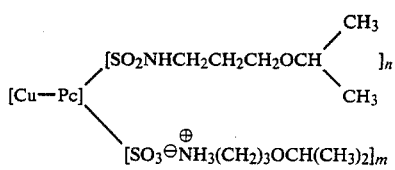

wherein, [Cu-Pc] represents a copper phthalocyanine residue; m represents a number of about 0.2 and n represents a number of about 2.5.

However, these dyes are not always sufficient in color fastness to washing and color fastness to dry cleaning and hence the improvement of these dyes have been desired.

SUMMARY OF THE INVENTION

An object of this invention is to provide a phthalocyanine dye having a specific substituent capable of dyeing cellulose fibers or a mixed fibers of polyester fibers and cellulose fibers to provide Turkish blue-dyed fibers or cloths thereof excellent in clor fastness to light and color fastness to washing.

As the result of various investigations, it has now been discovered that the aforesaid object can be attained by the reactive phthalocyanine dye of this invention as set forth hereinbelow.

That is, the invention provides a reactive phthalocyanine dye represented by general formula [I]

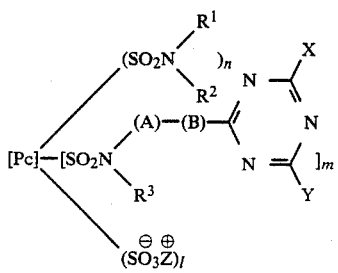

[I]

wherein, [Pc] represents a copper phthalocyanine residue or a nickel phthalocyanine residue; $R^1$, $R^2$, and $R^3$ each represents a hydrogen atom, a substituted or unsubstituted alkyl group, preferably having 1 to 10 carbon atoms (including carbon atoms of substituents if any and hereafter the same), a cyclohexyl group, an allyl group, or a substituted or unsubstituted aryl group, preferably having 6 to 8 carbon atoms; (A) represents a substituted or unsubstituted alkylene group, preferably having 2 to 4 carbon atoms, a substituted or unsubstituted arylene group, preferably having 6 carbon atoms, an aralkylene group, preferably having 7 to 8 carbon atoms or a group shown by —$R^7$—O—$R^8$— (wherein $R^7$ and $R^8$ each represents an alkylene group, preferably having 2 or 3 carbon atoms); (B) represents an oxygen atom or —NH—; X represents a fluorine atom or a cholorine atom; Y represents a group shown by —$NR^4R^5$ (wherein $R^4$ and $R^5$ each represents a hydrogen atom, a substituted or unsubstituted alkyl group, preferably having 1 to 10 carbon atoms, an alkenyl group, preferably having 3 to 5 carbon atoms, a cyclohexyl group, an aryl group, preferably having 6 to 8 carbon atoms, an aralkyl group, preferably having 7 to 10 carbon atoms or, as —$NR^4R^5$, a 5-membered or 6-membered nitrogen-containing heterocyclic ring formed by bonding $R^4$ and $R^5$) or a group shown by —$OR^6$ (wherein $R^6$ represents a hydrogen atom, a substituted or unsubstituted alkyl group, preferably having 1 to 6 carbon atoms, an alkenyl group, preferably having 3 to 5 carbon atoms, a cyclohexyl group, an aryl group, preferably having 6 to 8 carbon atoms, or an aralkyl group, preferably having 7 to 10 carbon atoms); Z represents a metal atom or an amine base; l represents a real number of 0 to 1; m represents a real number of 1 to 4, and n represents a real number of 0 to 2.

DESCRIPTION OF THE PREFERRED EMBODIMENTS

Then, the reactive phthalocyanine dyes of this invention shown by above-described general formula [I] will be explained in more detail.

Preferred examples of the unsubstituted alkyl group shown by $R^1$, $R^2$, and $R^3$ in general formula [I] includes a methyl group, an ethyl group, a straight chain or branched chain propyl, butyl, pentyl, hexyl, heptyl, or octyl group, etc. Preferred examples of the substituted alkyl group includes alkoxy-substituted lower alkyl groups such as a methoxyethyl group, an ethoxyethyl group, a 2-ethylhexyloxyethyl group, a γ-methoxypropyl group, a γ-isopropoxypropyl group, a γ-2-ethylhexyloxypropyl group, etc.; phenoxy-substituted lower alkyl groups such as a phenoxyethyl group, a γ-phenoxypropyl group, etc.; aralkyl groups such as a benzyl group, a phenethyl group, etc.; halogene-substituted lower alkyl groups such as a chloroethyl group, a bromoethyl group, etc.; alkoxycarbonyl-substituted lower alkyl groups such as a methoxycarbonylmethyl group, an ethyoxycarbonylethyl group, a butoxycarbonylethyl group, etc.; cyanoalkyl groups such as a cyanoethyl group, etc.; a tetrahydrofurfuryl group, etc. Preferred examples of the substituted or unsubstituted aryl group shown by $R^1$, $R^2$, and $R^3$ includes a phenyl group, a chlorophenyl group, a methylphenyl group, a butylphenyl group, a methoxyphenyl group, a butoxyphenyl group, an acetylaminophenyl group, etc.

Also, (A) in aforesaid general formula [I] preferably represents substituted or unsubstituted alkylene groups shown by —$CH_2$—$CH_2$—, —$CH_2$—$CH_2$—$CH_2$—,

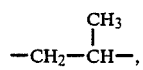

—$(CH_2)_6$—, —$C_2H_4OC_2H_4$—, etc, more preferably an ethylene group or a propylene group, or further represents a phenylene group, a methylphenylene group, a chlorophenylene group, or

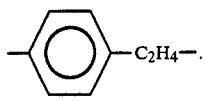

(B) in general formula [I] represents an oxygen atom or —NH—.

X in general formula [I] represents a fluorine atom or a chlorine atom or represents preferably a fluorine atom.

Y in general formula [I] represents a group shown by —NR$^4$R$^5$ or —OR$^6$ and R$^4$, R$^5$, and R$^6$ in the above formulae represent a hydrogen atom; a substituted or unsubstituted alkyl group; an alkenyl group such as an allyl group, a crotyl group, etc.; a cyclohexyl group; an aryl group such as a phenyl group, etc.; or an aralkyl group such as a benzyl group, a phenetyl group, etc., or —NR$^4$R$^5$ may form a 5-membered or 6-membered nitrogen-containing heterocyclic ring formed by bonding R$^4$ and R$^5$.

The substituted or unsubstituted alkyl group shown by R$^4$, R$^5$ and R$^6$ includes the alkyl groups and the substituted alkyl groups described above in regard to R$^1$, R$^2$ and R$^3$.

The 5-membered or 6-membered nitrogen-containing heterocyclic ring formed by bonding R$^4$ and R$^5$ includes a 1-pyrrolidinyl group, a 3-methyl-1-pyrrolidinyl group, a 2-hydroxyethyl-1-pyrrolidinyl group, a 2,5-dimethyl-1-pyrrolidinyl group, a 3-thiazolidinyl group, a 1-pyrrolyl group, a 1-pyrazolyl group, a 1-imidazolyl group, a morpholino group, a piperidino group, a 2,6-dimethylpiperidino group, a 1-piperadinyl group, a 4-methyl-1-piperadinyl group, etc.

It is particularly preferred that —NR$^4$R$^5$ is a dialkylamino group having 4 to 12 carbon atoms such as N,N-diethylamine, N,N-dibutylamine, etc., or a monoalkylamino group having 4 to 12 carbon atoms, such as γ-isopropoxypropylamine, N-butylamine, 2-ethylhexylamine, etc.

Z in general formula [I] represents a metal such as sodium, potassium, etc., or an amine base shown by general formula [II]

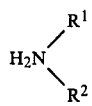

wherein R$^1$ and R$^2$ are as defined above in regard to general formula [I].

More preferred reactive phthalocyanine dyes of the present invention include those represented by general formula (I-1)

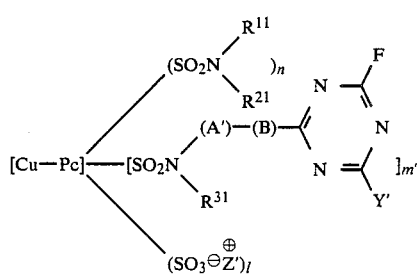

wherein [Cu-Pc] represents a copper phthalocyanine residue; R$^{11}$, R$^{21}$, R$^{31}$ each represents a hydrogen atom or a substituted or unsubstituted alkyl group; (A') represents alkylene group or a group shown by —R$^{71}$—O—R$^{81}$— (wherein R$^{71}$ and R$^{81}$ each represents a lower alkylene group); (B) represents an oxygen atom or group —NH—; Y' represents —NR$^{41}$R$^{51}$ when (B) represents an oxygen atom (wherein R$^{41}$ and R$^{51}$ each represents a hydrogen atom, a substituted or unsubstituted alkyl group, an alkenyl group, a cyclohexyl group, an aryl group, an aralkyl group or, as —NR$^{41}$R$^{51}$, 5-membered nitrogen-containing heterocyclic ring formed by bonding R$^{41}$ and R$^{51}$ or Y' represents OR$^{61}$ when (B) represents a group —NH— (wherein R$^{61}$ represents hydrogen atom, a substituted or unsubstituted alkyl group, alkenyl group, a cyclohexyl group, an aryl group, or an aralkyl group); Z' represents an alkali metal atom or alkyl ammonium salt; m' represents a real number of 1 to 2.

The most preferred reactive phthalocyanine dyes of the present invention are those represented by general formula (I-2)

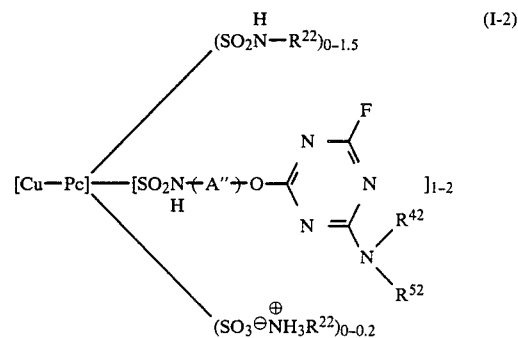

wherein [Cu-Pc] represents a copper phthalocyanine residue; R$^{22}$ represents a substituted or unsubstituted alkyl group; (A'') represents an alkylene group; R$^{42}$ and R$^{52}$ each represents a hydrogen atom or a substituted or unsubstituted alkyl group. Of those reactive phthalocyanine dyes, dyes represented by general formula (I-3) are particularly preferred:

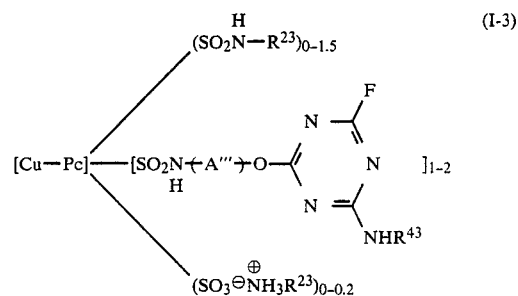

wherein [Cu-Pc] represents a copper phthalocyanine residue; R$^{23}$ represents a lower alkyl group of a lower alkyl group substituted by a hydroxyl group or a lower alkoxy group; A''' represents a C$_2$-C$_4$alkylene group; R$^{43}$ represents a lower alkyl group or a lower alkyl group substituted by a lower alkoxy group.

The reactive phthalocyanine dye of this invention shown by above-described general formula [I] is produced by reacting an acid chloride shown by general formula [III]

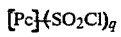 [III]

(wherein [Pc] is as defined above and q is a real number of 1 to 4)
with an amine shown by general formula [IV]

 [IV]

(wherein $R^1$ and $R^2$ are as defined above)
and a substituted amine shown by general formula [V]

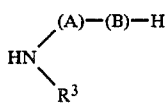 (V)

(wherein $R^3$, (A), and (B) are as defined above)
in succession or simultaneously in an aqueous solvent or an organic solvent such as acetone, N-methylpyrrolidone, etc., in the presence of an acid scavenger such as triethylamine, sodium carbonate, etc., for 2 to 24 hours at 0° C. to 30° C. to produce a compound shown by following general formula [VI]

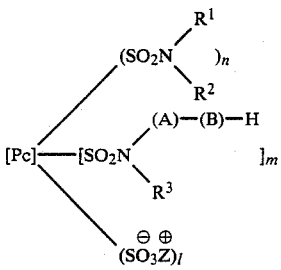 [VI]

(wherein [Pc], $R^1$, $R^2$, $R^3$, (A), (B), X, Z, l, m, and n are as defined above);
subjecting the compound of general formula [VI] above thus obtained to a dihalogenocyanuration reaction in a solvent such as N-methylpyrrolidone, etc., in the presence of an acid scavenger such as triethylamine, sodium carbonate, etc., at −5° C. to 10° C. to produce a compound shown by general formula [VII]

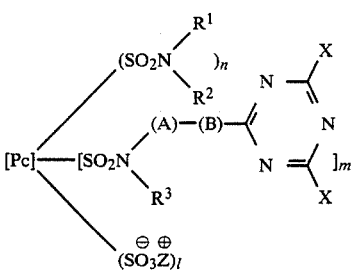 [VII]

(wherein [Pc], $R^1$, $R^2$, $R^3$, (A), (B), X, Z, l, m, and n are as defined above); and then reacting the compound of general formula [VII] thus produced with an alcohol or an amine shown by general formula [VIII]

YH [VIII]

(wherein Y is as defined above)
in a solvent such as N-methylpyrrolidone, acetone, etc., in the presence of an acid scavenger such as triethylamine, sodium carbonate, etc., for 2 to 10 hours at −5° C. to 10° C.

As fibers which are dyed by the dyes of this invention, there are fibers such as cellulose (e.g., cotton), hemp, viscose rayon, copper ammonia rayon, partially aminated or partially amyllated cellulose fibers, polyester fibers, polyamide fibers, nylon fibers, wool, polyurethane fibers, diacetate fibers, triacetate fibers, etc., as well as the cloths, mixed yarn cloths, mixed yarn fabrics, woven or knitted goods, etc., (hereinafter, these cloths and fabrics are included in the term of "fibers"). The dyes of this invention are particularly effective for cellolose fibers and the mixed fibers of cellolose fibers and polyester fibers in the above-described fibers.

At the practice of dyeing, it is preferred to finely disperse the dye of this invention shown by above-described general formula [I] in a medium to an extent of 0.5 to 2 microns and as the dispersing method thereof, there are;

(a) a method of finely dispersing the dye in water by means of a grinder such as a sand grinder, a mill, etc., using a nonionic surface active agent such as a Pluronic type surface active agent, etc., or an anionic surface active agent, (b) a method of finely dispersing the dye in a solvent or solvent mixture other than water (e.g., alcohols such as ethyl alcohol, isopropyl alcohol and polyethylene glycol, ketones and as acetone and methyl ethyl ketone, hydrocarbons such as n-hexane, toluene, xylene and mineral turpentines, halogenated hydrocarbons such as tetrachloroethylene, esters such as ethyl acetate and butyl acetate, and ethers such as dioxane and tetraethylene glycol dimethyl ether) using a water sparingly soluble or water-insoluble dispersing agent such as a sulfosuccinic acid ester, an addition product of nonylphenol, etc., and a low molar amount of ethylene oxide, etc., and (c) a method of finely dispersing the dye in a mixture of water and a water-miscible solvent in the above-described solvents.

Furthermore, in the above-described finely dispersing step, a high molecular compound soluble in the dispersion medium or a surface active agent mainly having a function other than the dispersing action may be added to the dispersing system.

The fine dispersion of the dye of this invention can be used as a dyeing bath for a dip dyeing method or a padding dyeing method or as a coloring paste for a printing dyeing method as it is.

In general, the fine dispersion of the dye of this invention prepared as described above is diluted with water, an aqueous solution of an organic solvent, or an emulsion of a hydrocarbon, a halogenated hydrocarbon, etc. and water in a desired concentration of the dye, and the diluted dispersion is used as a dip dyeing bath, a padding dyeing bath, or a printing color paste.

In the preparation of the dip dyeing bath, the padding dyeing bath or the printing color paste, an alkali metal compound or an alkali precursor capable of forming an alkali metal when heated in the presence of water can be added to the dispersion as an acid binding agent.

The acid binding agent may be usually used in such an amount that the pH of the dip dyeing bath, padding dyeing bath or the printing color paste becomes 7.5 to 9.0.

Also, in the case of dyeing fibers containing cellulose with the dyeing bath or the color paste containing the dye of this invention, it is preferred that a cellulose fiber-swelling agent exists in the dyeing bath or the color paste.

Any cellulose fiber-swelling agents having a boiling point of higher than 150° C. and an effect of swelling cellulose fibers can be used as the aforesaid swelling agent and examples thereof are ureas such as N,N,N',N'-tetramethylurea, etc., polyhydric alcohols such as polyethylene glycol, polypropylene glycol, etc., and derivatives thereof. Particularly preferred are derivatives of polyhydric alcohols such as polyethylene glycol and polypropylene glycol which do not react with the reactive groups of the dyes and which have an average molecular weight between about 200 and 500 and have their terminal hydroxyl groups dimethylated or monomethylated.

The amount of the cellulose fiber-swelling agent is generally about 5 to 25% by weight, preferably about 8 to 15% by weight based on the amount of the padding dyeing bath or the printing color paste.

The above-described mixed fibers may be dyes by the reactive phthalocyanine dye of this invention shown by general formula [I] described above in a conventional manner. For example, the mixed fibers are dipped in the dyeing bath prepared by the method described above or are printed with the color paste prepared as described above, after drying, heat-treated, and then washed with hot water containing a surface active agent.

By dyeing the various fibers described above using the dyes of this invention, Turkish blue fibers which are clearly and uniformly dyed and have good various fastnesses, in particular good color fastness to light and good color fastness to washing can be obtained. Also, the Turkish blue fibers thus obtained also show good color fastness to dry cleaning.

The following examples are intended to illustrate the present invention but not to limit in any way.

EXAMPLE 1

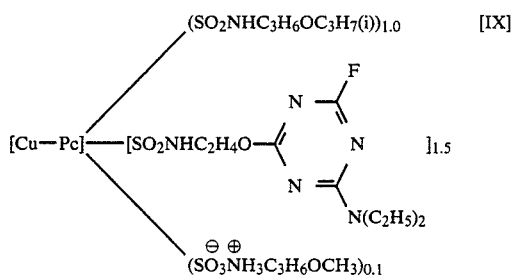

An aqueous dye composition was prepared by finely dispersing 10 parts (by weight) of the reactive copper phthalocyanine series dye of this invention shown by above formula [IX], 3 parts of lignin sulfonic acid salts, 4 parts of polyoxyethylene glycol nonylphenyl ether (HLB 13.3), 5 parts of ethylene glycol, 0.1 part of a silicon series defoaming agent, and 77.9 parts of water using a paint shaker as a finely dispersing means.

A printing color paste (pH 8.5) having the following composition was prepared using the dye composition thus obtained.

| Dye composition | 6.5 g |
| Aqueous 5% sodium alginate solution | 55 g |
| Polyethylene glycol dimethyl ether having mean molecular weight of 400 | 9 g |
| Water | Rest |
| Total | 100 g |

A mixed fiber spun cloth of polyester and cotton (mixing ratio of 65/35) was printed with the printing color paste using a screen printing machine and after temporarily drying for 3 minutes at 80° C., the printed dye was fixed by high-temperature steaming for 5 minutes at 190° C. Then, after washing with water, the cloth thus printed was subjected to soaping for 20 minutes at 80° C. using a washing solution containing 2 g/l of a nonionic surface active agent (Scoarole #900, registered trade mark, made by Kao Corporation) at a bath ratio of 1:30 to provide the Turkish blue dyed product excellent in color fastness to light, color fastness to washing and color fastness to dry cleaning.

In addition, the dye used in this example was prepared by the following method.

That is, 20 g of copper phthalocyanine substituted by, on an average, 2.5 molecules of sulfonic acid chloride was dissolved in 250 ml of N-methylpyrrolidone and after adding 3.0 g of ethanolamine and 10.0 g of triethylamine to the solution thus obtained, they were reacted for 2 hours at room temperature and then, after further adding thereto 3.3 g of γ-isopropoxypropylamine, the reaction was performed for 2 hours at the same temperature as above. Thereafter, the reaction mixture thus obtained was cooled to −5° C. and 6.6 g of trifluorotriazine and then 9.7 g of triethylamine were added to the reaction mixture. Then, after further adding thereto 3.5 g of diethylamine and performing reaction for 2 hours at 0° C. to 5° C., the reaction mixture obtained was poured in 100 ml of ice-water. Precipitates thus deposited were collected by filtration and washed with water to provide 26.3 g (yield of 90%) of the dye shown by formula [IX] above.

In addition, $\lambda_{max}$ (DMF) of the dye thus obtained was 670 n.m.

EXAMPLE 2

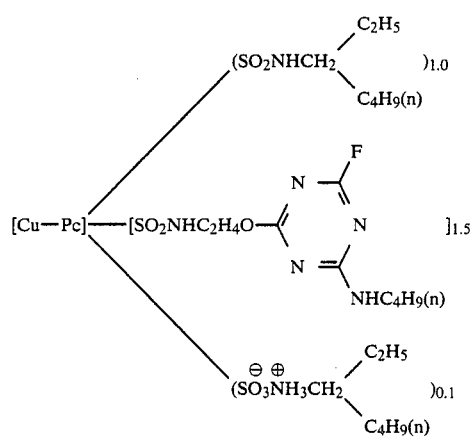

A dye composition composed of 15 parts of the reactive copper phthalocyanine dye of this invention shown by the above structural formula, 10 parts of a Pluronic type surface active agent (Pluronic L64, registered trade name, made by Asahi Denka Kogyo K.K.), and 75 parts of water was finely dispersed using a sand grinder as a finely dispersing machine to provide a dye dispersion.

A printing color paste (pH 8.0) having the following composition was prepared using the dye dispersion thus obtained.

| Dye dispersion | 10 g |
| --- | --- |
| Aqueous 5% sodium alginate solution | 55 g |
| $CH_3O(C_2H_4O)_6H$ | 12 g |
| Water | 23 g |
| Total | 100 g |

A cotton broad cloth (40 cotton count) was printed with the printing color paste thus prepared using a screen printing machine, temporarily dried for 3 minutes at 80° C., and thereafter treated with super heated steam for 7 minutes at 185° C.

Then, the dyed cloth was washed by the same manner as described in Example 1 to provide the Turkish blue dyed product excellent in color fastness to light and color fastness to washing.

In addition, the dye used in this example was prepared according to a similar method to those described in Example 1 and $\lambda_{max}$ (DMF) of the dye was 670 n.m.

EXAMPLE 3

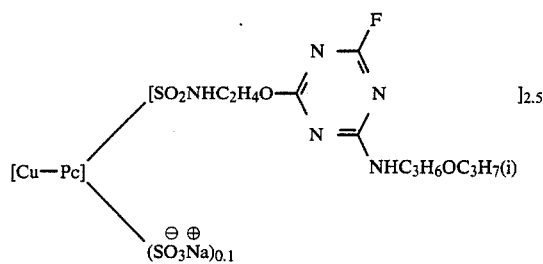

An aqueous dye compoisition was prepared by finely dispersing 10 parts of a copper phthalocyanine dye shown by the above-described structural formula, 2 parts of a naphthalenesulfonic acid-formaldehyde condensation product, 4 parts of polyoxyethylene glycol nonylphenyl ether (HLB 13.3), 5 parts of ethylene glycol, 0.1 part of a silicon series defoaming agent, and 77.9 parts of water using a sand grinder.

A padding bath (pH 8.5) having the following composition was prepared using the dye composition thus prepared.

| Dye composition | 6 g |
| --- | --- |
| $CH_3O(C_2H_4O)_{12}H$ | 10 g |
| Water | Rest |
| Total | 100 g |

A mixed fiber spun cloth of polyester and cotton (mixing ratio of 65/35) was impregnated with the padding bath, after squeezing to a squeezing rate of 45%, the cloth was dried for 2 minutes at 100° C., and then fixing of the dye was performed by dry air for one minute at 200° C.

Then, the cloth was washed according to the method described in Example 1 to provide the Turkish blue dyed product excellent in color fastness to light and color fastness to washing.

In addition, the dye used in this example was prepared by the following method.

That is, 20 g of copper phthalocyanine substituted by, on an average, 2.5 molecules of sulfonic acid chloride was dispersed in 400 g of ice-water and after adding thereto 11.4 g of ethanolamine and 6.0 g of sodium acetate, they are reacted for 5 hours at 0° C. to 5° C. and then for 15 hours at room temperature. The reaction mixture thus obtained was heated to 55° C. to 60° C. for one hours and then filtered at the temperature. The reaction mixture was washed well with hot water containing 0.1% sodium carbonate and then dried to provide 13.0 g (yield 60%) of the dye having following structural formula [X]

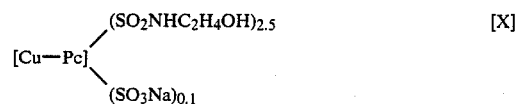

Then, 13.0 g of the well-dried dye of aforesaid structural formula [X] was dissolved in 130 ml of N-methylpyrrolidone and after cooling the solution to −5° C., 6.0 g of trifluorotriazine and then 9.0 g of triethylamine. Then, after further adding 5.7 g of γ-isopropoxypropylamine to the mixture, they were reacted for 2 hours at 0° C. to 5° C. and, thereafter, the reaction mixture thus obtained was poured in 100 ml of ice-water. Precipitates thus deposited were collected by filtration and washed well with water to provide 20.8 g (yield 90%) of the desired dye.

In addition, $\lambda_{max}$ (DMF) of the dye was 670 n.m.

EXAMPLE 4

The phthalocyanine series dyes described in Table 1 below were prepared according to methods similar to the method described in Example 1 and aqueous dye compositions were prepared using the dyes thus obtained according to the method described in Example 1. Then, mixed fiber spun cloths of polyester and cotton (mixing ratio of 65/35) were printed using the dye compositions by the method described in Example 1. Thus, Turkish blue dyed products excellent in color fastbess to light and color fastness to washing were obtained in all cases.

The dyes used in this examples are shown in Table 1.

TABLE

| No. | [Pc] | -R¹ | -R² | -R³ | -(A)- | -(B)- | -X | -Y | Z⊕ | n | m | l | Hue of Dyed Cloth | λmax (DMF) nm |
|---|---|---|---|---|---|---|---|---|---|---|---|---|---|---|
| 1 | copper-phthalocyanine residue | -H | -C₃H₆OCH₃ | -H | -C₂H₄- | -O- | -F | -N(C₂H₅)₂ | ⊕NH₃C₃H₆OCH₃ | 1.0 | 1.5 | 0.1 | Turkish blue | 670 |
| 2 | copper-phthalocyanine residue | -H | -C₃H₆OC₃H₇(i) | -H | -C₂H₄- | -O- | -F | -N(C₂H₅)₂ | ⊕NH₃C₃H₆OC₃H₇(i) | 1.0 | 1.5 | 0.1 | Turkish blue | 670 |
| 3 | copper-phthalocyanine residue | -H | -C₃H₆OCH₂CH(C₂H₅)(C₄H₉(n)) | -H | -C₂H₄- | -O- | -F | -N(C₂H₅)₂ | ⊕NH₃C₃H₆OCH₂CH(C₂H₅)(C₄H₉(n)) | 1.0 | 1.5 | 0.1 | Turkish blue | 670 |
| 4 | copper-phthalocyanine residue | -H | -C₄H₉(n) | -H | -C₂H₄- | -O- | -F | -N(C₂H₅)₂ | ⊕NH₃C₄H₉(n) | 1.0 | 1.5 | 0.1 | Turkish blue | 670 |
| 5 | copper-phthalocyanine residue | -H | -C₂H₅ | -H | -C₂H₄- | -O- | -F | -N(C₂H₅)₂ | ⊕NH₃C₂H₅ | 1.0 | 1.5 | 0.1 | Turkish blue | 670 |
| 6 | copper-phthalocyanine residue | -H | -CH₂CH(C₂H₅)(C₄H₉(n)) | -H | -C₂H₄- | -O- | -F | -N(C₂H₅)₂ | ⊕NH₃CH₂CH(C₂H₅)(C₄H₉) | 1.0 | 1.5 | 0.1 | Turkish blue | 670 |
| 7 | copper-phthalocyanine residue | -H | -C₈H₁₇(n) | -H | -C₂H₄- | -O- | -F | -NHC₃H₆OCH₃ | ⊕NH₃C₈H₁₇(n) | 1.0 | 1.5 | 0.1 | Turkish blue | 670 |
| 8 | copper-phthalocyanine residue | -H | -C₂H₄OCH₃ | -H | -C₂H₄- | -O- | -F | -NHC₃H₆OCH₃ | ⊕NH₃C₂H₄OCH₃ | 1.0 | 1.5 | 0.1 | Turkish blue | 670 |
| 9 | copper-phthalocyanine residue | -H | -CH₂-(tetrahydrofuranyl) | -H | -C₂H₄- | -O- | -F | -NHC₃H₆OCH₃ | ⊕NH₃CH₂-(tetrahydrofuranyl) | 1.0 | 1.5 | 0.1 | Turkish blue | 670 |
| 10 | copper-phthalocyanine residue | -H | -C₆H₄(phenyl) | -H | -C₂H₄- | -O- | -F | -NHC₃H₆OCH₃ | ⊕NH₃-(phenyl) | 1.0 | 1.5 | 0.1 | Turkish blue | 670 |

TABLE-continued

| No. | [Pc] | —R¹ | —R² | —R³ | —(A)— | —(B)— | —X | —Y | Z⊕ | n | m | l | Hue of Dyed Cloth | λmax (DMF) nm |
|---|---|---|---|---|---|---|---|---|---|---|---|---|---|---|
| 11 | copper-phthalo-cyanine residue | —H | 3-methylphenyl (—C₆H₄—CH₃) | —H | —C₂H₄— | —O— | —F | —NHC₂H₄OCH₃ | Na⊕ | 1.0 | 1.5 | 0.1 | Turkish blue | 670 |
| 12 | copper-phthalo-cyanine residue | —H | —CH₂—CH=CH₂ | —H | —C₂H₄— | —O— | —F | —NHC₂H₄OCH₃ | ⊕NH₃CH₂—CH=CH₂ | 1.0 | 1.5 | 0.1 | Turkish blue | 670 |
| 13 | copper-phthalo-cyanine residue | —H | 4-n-butylphenyl (—C₆H₄—C₄H₉(n)) | —H | —C₂H₄— | —O— | —F | —OCH₃ | Na⊕ | 1.0 | 1.5 | 0.1 | Turkish blue | 670 |
| 14 | copper-phthalo-cyanine residue | —H | 4-acetamidophenyl (—C₆H₄—NHCOCH₃) | —H | —C₂H₄— | —O— | —F | —OCH₃ | Na⊕ | 1.0 | 1.5 | 0.1 | Turkish blue | 670 |
| 15 | copper-phthalo-cyanine residue | —H | cyclohexyl | —H | —C₂H₄— | —O— | —F | —NHC₃H₆OC₃H₇(i) | ⊕NH₃-cyclohexyl | 1.0 | 1.5 | 0.1 | Turkish blue | 670 |
| 16 | copper-phthalo-cyanine residue | —H | —C₂H₄Br | —H | —C₂H₄— | —O— | —F | —NHC₃H₆OC₃H₇(i) | ⊕NH₃C₂H₄Br | 1.0 | 1.5 | 0.1 | Turkish blue | 670 |
| 17 | copper-phthalo-cyanine residue | —H | —C₃H₆O—C₆H₅ | —H | —C₂H₄— | —O— | —F | —NHC₃H₆OC₃H₇(i) | ⊕NH₃C₃H₆O—C₆H₅ | 1.0 | 1.5 | 0.1 | Turkish blue | 670 |
| 18 | copper-phthalo-cyanine residue | —H | —CH₂—C₆H₅ | —H | —C₂H₄— | —O— | —F | —NHC₃H₆OC₃H₇(i) | ⊕NH₃CH₂—C₆H₅ | 1.0 | 1.5 | 0.1 | Turkish blue | 670 |

TABLE-continued

| No. | [Pc] | —R¹ | —R² | —R³ | —(A)— | —(B)— | —X | —Y | Z⊕ | n | m | l | Hue of Dyed Cloth | λmax (DMF) nm |
|---|---|---|---|---|---|---|---|---|---|---|---|---|---|---|
| 19 | copper-phthalo-cyanine residue | —H | —C₂H₄— | —H | —C₂H₄— | —O— | —F | —N(C₄H₉)₂ | ⊕NH₃C₂H₄ | 1.0 | 1.5 | 0.1 | Turkish blue | 670 |
| 20 | copper-phthalo-cyanine residue | —H | —CH₂COOCH₃ | —H | —C₂H₄— | —O— | —F | —N(C₄H₉)₂ | Na⊕ | 1.0 | 1.5 | 0.1 | Turkish blue | 670 |
| 21 | copper-phthalo-cyanine residue | — | — | —H | —C₂H₄— | —O— | —F | —N(C₂H₅)₂ | — | 0 | 2.5 | 0 | Turkish blue | 670 |
| 22 | copper-phthalo-cyanine residue | — | — | —H | —C₂H₄— | —O— | —F | —NHC₃H₇(n) | — | 0 | 2.5 | 0 | Turkish blue | 670 |
| 23 | copper-phthalo-cyanine residue | — | — | —H | —C₂H₄— | —O— | —F | —N(C₄H₉)₂ | — | 0 | 2.5 | 0 | Turkish blue | 670 |
| 24 | copper-phthalo-cyanine residue | — | — | —H | —C₂H₄— | —O— | —F | —NHC₂H₄OCH₃ | — | 0 | 2.5 | 0 | Turkish blue | 670 |
| 25 | copper-phthalo-cyanine residue | — | — | —H | —C₂H₄— | —O— | —F | —NHC₃H₆OCH₃ | ⊕NH₃C₂H₄OH | 0 | 2.5 | 0.1 | Turkish blue | 670 |
| 26 | copper-phthalo-cyanine residue | — | — | —H | —C₃H₆— | —O— | —F | —NHC₃H₆OC₃H₇(i) | — | 0 | 2.5 | 0 | Turkish blue | 670 |
| 27 | copper-phthalo-cyanine residue | — | — | —H | —C₃H₆— | —O— | —F | —NHC₆H₁₃(n) | — | 0 | 2.5 | 0 | Turkish blue | 670 |
| 28 | copper-phthalo-cyanine residue | — | — | —H | —C₃H₆— | —O— | —F | —NH—CH₂ | — | 0 | 2.5 | 0 | Turkish blue | 670 |
| 29 | copper-phthalo-cyanine residue | — | — | —H | —C₃H₆— | —O— | —F | morpholino | — | 0 | 2.5 | 0 | Turkish blue | 670 |
| 30 | copper-phthalo-cyanine residue | — | — | —H | —C₃H₆— | —O— | —F | —NHCH₂ | — | 0 | 2.5 | 0 | Turkish blue | 670 |

TABLE-continued

| No. | [Pc] | —R¹ | —R² | —R³ | —(A)— | —(B)— | —X | —Y | Z⊕ | n | m | l | Hue of Dyed Cloth | λmax (DMF) nm |
|---|---|---|---|---|---|---|---|---|---|---|---|---|---|---|
| 31 | copper-phthalocyanine residue | — | — | —H | —C₃H₆— | —O— | —F | —N(C₂H₅)₂ | — | 0 | 2.5 | 0 | Turkish blue | 670 |
| 32 | copper-phthalocyanine residue | — | — | — | —C₂H₄O—4H₂C | —O— | —F | —N(C₂H₅)₂ | — | 0 | 2.5 | 0 | Turkish blue | 670 |
| 33 | copper-phthalocyanine residue | — | — | —H | —C₂H₄O—4H₂C | —O— | —F | —NHC₄H₉(n) | — | 0 | 2.5 | 0 | Turkish blue | 670 |
| 34 | copper-phthalocyanine residue | — | — | —H | —C₃H₆— | —O— | —F | —NHC₈H₁₇(i) | ⊕NH₃C₃H₆OH | 0 | 3.0 | 0.2 | Turkish blue | 670 |
| 35 | copper-phthalocyanine residue | — | — | —H | ![m-xylylene] | —O— | —F | —N(C₄H₉)₂ | ⊕NH₃C₃H₆OH | 0 | 3.0 | 0.2 | Turkish blue | 670 |
| 36 | copper-phthalocyanine residue | — | — | —H | —CH₂—CH(CH₃)— | —O— | —F | —N(C₄H₉)₂ | — | 0 | 3.0 | 0 | Turkish blue | 670 |
| 37 | copper-phthalocyanine residue | — | — | —H | —CH₂—CH(CH₃)— | —O— | —F | —N(C₂H₅)₂ | — | 0 | 2.5 | 0 | Turkish blue | 670 |
| 38 | copper-phthalocyanine residue | — | — | —H | —C₆H₁₂— | —NH— | —F | —N(C₂H₅)₂ | — | 0 | 2.5 | 0 | Turkish blue | 670 |
| 39 | copper-phthalocyanine residue | — | — | —H | —C₆H₁₂— | —NH— | —F | —NH—C₆H₅ | — | 0 | 2.5 | 0 | Turkish blue | 670 |

TABLE-continued

| No. | [Pc] | -R¹ | -R² | -R³ | -(A)- | -(B)- | -X | -Y | Z⊕ | n | m | l | Hue of Dyed Cloth | λmax (DMF) nm |
|---|---|---|---|---|---|---|---|---|---|---|---|---|---|---|
| 40 | copper-phthalo-cyanine residue | — | — | —H | —C₆H₁₂— | —NH— | —F | $-N\begin{matrix}CH_3\\C_6H_5\end{matrix}$ | — | 0 | 2.5 | 0 | Turkish blue | 670 |
| 41 | copper-phthalo-cyanine residue | —C₂H₅ | —C₂H₅ | —C₂H₅ | —C₂H₄— | —O— | —Cl | —N(C₂H₅)₂ | ⊕NH₂(C₂H₅)₂ | 1.0 | 1.5 | 0.1 | Turkish blue | 670 |
| 42 | copper-phthalo-cyanine residue | —H | —C₂H₄CN | —C₂H₅ | —C₂H₄— | —O— | —Cl | —N(C₂H₅)₂ | ⊕NH₃C₂H₄CN | 1.0 | 1.5 | 0.1 | Turkish blue | 670 |
| 43 | copper-phthalo-cyanine residue | —C₄H₉ | —C₄H₉ | —C₂H₅ | —C₂H₄— | —O— | —Cl | —N(C₂H₅)₂ | ⊕NH₃(C₄H₉(n))₂ | 1.0 | 1.5 | 0.1 | Turkish blue | 670 |
| 44 | copper-phthalo-cyanine residue | —H | —C₃H₆—C₆H₅ | —H | —C₃H₆— | —O— | —Cl | —N(C₂H₅)₂ | ⊕NH₃C₃H₆—C₆H₅ | 1.0 | 1.5 | 0.1 | Turkish blue | 670 |
| 45 | copper-phthalo-cyanine residue | —H | —C₆H₄—OCH₃ | —H | —C₃H₆— | —NH— | —Cl | —NHC₂H₄OCH₃ | ⊕NH₃—C₆H₄—OCH₃ | 2 | 1.2 | 0.2 | Turkish blue | 670 |
| 46 | copper-phthalo-cyanine residue | —H | —CH₂—CH=CH₂ | —H | —C₃H₆— | —NH— | —Cl | —NHC₂H₄OCH₃ | ⊕NH₃CH₂—CH=CH₂ | 2 | 1.2 | 0.2 | Turkish blue | 670 |
| 47 | copper-phthalo-cyanine residue | —CH₂—CH=CH₂ | —CH₂—CH=CH₂ | —C₂H₅ | —C₆H₄(m)— | —NH— | —Cl | —NHC₂H₄OCH₃ | ⊕NH₂(CH₂—CH=CH₂)₂ | 2 | 1.2 | 0.2 | Turkish blue | 670 |

TABLE-continued

| No. | [Pc] | —R¹ | —R² | —R³ | —(A)— | —(B)— | —X | —Y | Z⊕ | n | m | l | Hue of Dyed Cloth | λmax (DMF) nm |
|---|---|---|---|---|---|---|---|---|---|---|---|---|---|---|
| 48 | copper-phthalo-cyanine residue | —C₂H₅ | —C₂H₄CN | —C₂H₅ | ⟨phenyl⟩ | —NH— | —Cl | —NHC₃H₆OCH₃ | ⊕NH₂—C₂H₅ \ C₂H₄CN | 2 | 1.2 | 0.2 | Turkish blue | 670 |
| 49 | copper-phthalo-cyanine residue | —H | —C₃H₆OC₂H₄O-phenyl | —H | —CH₂—CH(CH₃)— | —NH— | —Cl | —NHC₃H₆OCH₃ | ⊕NH₃C₃H₆OC₂H₄O-phenyl | 2 | 1.2 | 0.2 | Turkish blue | 670 |
| 50 | copper-phthalo-cyanine residue | —C₆H₁₃(n) | —C₆H₁₃(n) | —C₃H₇(i) | —CH₂—CH(CH₃)— | —NH— | —Cl | —NHC₃H₆OC₃H₇(i) | ⊕NH₂(C₆H₁₃(n))₂ | 2 | 1.2 | 0.2 | Turkish blue | 670 |
| 51 | nickel-phthalo-cyanine residue | —H | —C₃H₆OCH₃ | —H | —C₂H₄— | —O— | —F | —N(C₂H₅)₂ | ⊕NH₃C₃H₆OCH₃ | 1 | 1.5 | 0.1 | Turkish blue | 667 |
| 52 | nickel-phthalo-cyanine residue | —H | —C₃H₆OC₃H₇(i) | —H | —C₂H₄— | —O— | —F | —NHC₃H₆OCH₃ | ⊕NH₃C₃H₆OC₃H₇(i) | 1 | 1.5 | 0.1 | Turkish blue | 667 |
| 53 | nickel-phthalo-cyanine residue | —H | —C₄H₉(n) | —H | —C₂H₄— | —O— | —F | —NHC₃H₆OCH₃ | ⊕NH₃C₄H₉(n) | 1 | 1.5 | 0.1 | Turkish blue | 667 |
| 54 | nickel-phthalo-cyanine residue | —H | —H | —H | —C₃H₆— | —O— | —Cl | -phenyl-NH- | ⊕NH₄ | 1 | 2 | 0.1 | Turkish blue | 667 |
| 55 | nickel-phthalo-cyanine residue | —H | —C₂H₄-phenyl | —H | —C₃H₆— | —O— | —F | —NHC₄H₉(n) | ⊕NH₃C₂H₄-phenyl | 1 | 2 | 0.1 | Turkish blue | 667 |
| 56 | nickel-phthalo-cyanine residue | —C₂H₅ | —C₂H₅ | —C₂H₅ | —C₂H₄O—4H₂C— | —O— | —F | —NHC₂H₄OCH₃ | ⊕NH₂(C₂H₅)₂ | 1 | 2 | 0.1 | Turkish blue | 667 |

TABLE-continued

| No. | [Pc] | -R¹ | -R² | -R³ | -(A)- | -(B)- | -X | -Y | Z⊕ | n | m | l | Hue of Dyed Cloth | λmax (DMF) nm |
|---|---|---|---|---|---|---|---|---|---|---|---|---|---|---|
| 57 | nickel-phthalo-cyanine residue | — | — | $-C_2H_5$ | $-C_2H_4O-_4H_2C-$ | $-O-$ | $-F$ | $-NHC_3H_6OCH_3H_7(i)$ | — | 0 | 2.5 | 0 | Turkish blue | 667 |
| 58 | nickel-phthalo-cyanine residue | — | — | $-H$ | $\begin{array}{c}CH_3\\|\\-CH_2CH-\end{array}$ | $-O-$ | $-F$ | $-N(C_4H_9)_2$ | — | 0 | 2.5 | 0 | Turkish blue | 667 |
| 59 | nickel-phthalo-cyanine residue | — | — | $-H$ | -C₆H₄(m)- | $-NH-$ | $-F$ | $-N(C_6H_{13})_2$ | — | 0 | 3.5 | 0 | Turkish blue | 667 |
| 60 | nickel-phthalo-cyanine residue | — | — | $-H$ | $-C_2H_4-$ | $-O-$ | $-F$ | $-N\begin{smallmatrix}H\\ \diagdown\\ \diagup\\ C_6H_{13}\end{smallmatrix}$ | — | 0 | 3.5 | 0 | Turkish blue | 667 |

While the invention has been described in detail and with reference to specific embodiments thereof, it will be apparent to one skilled in the art that various changes and modifications can be made therein without departing from the spirit and scope thereof.

What is claimed is:

1. A reactive phthalocyanine dye which is substantially water-insoluble and is represented by general formula (I)

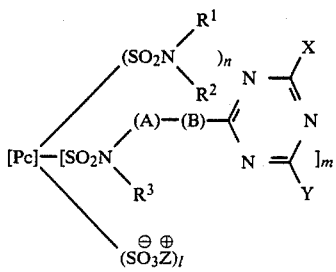

wherein [Pc] represents a copper phthalocyanine residue or a nickel phthalocyanine residue; $R^1$, $R^2$, and $R^3$ each represents a hydrogen atom, an alkyl group which may be substituted with an alkoxy group, a phenoxy group, a halogen atom, an alkoxycarbonyl group, a cyano group or a tetrahydrofuryl group, a cyclohexyl group, an allyl group, or a phenyl group which may be substituted with a lower alkyl group; (A) represents an alkylene group, a phenylene group, or a group shown by —$R^7$—O—$R^8$— (wherein $R^7$ and $R^8$ each represents an alkylene group); (B) represents an oxygen atom, or a group shown by —NH—; X represents a fluorine atom, or a chlorine atom; Y represents a group shown by —$NR^4R^5$ when (B) represents an oxygen atom (wherein $R^4$ and $R^5$ each represents a hydrogen atom, an alkyl group which may be substituted with an alkoxy group, a phenoxy group, a halogen atom, an alkoxycarbonyl group, a cyano group or a tetrahydrofuryl group, an alkenyl group, a cyclohexyl group, an aryl group, an aralkyl group, or as —$NH^4R^5$, a 5-membered or 6-membered nitrogen-containing heterocyclic ring formed by bonding $R^4$ and $R^5$), or Y represents a group shown by —$OR^6$ when (B) represents a group shown by —NH— (wherein $R^6$ represents a hydrogen atom, or an alkyl group); Z represents a metal atom, or an amine base; l represents a real number of 0 to 0.2; m represents a real number of 1 to 4; and n represents a real number of 0 to 2.

2. A reactive phthalocyanine dye as claimed in claim 1, wherein said alkyl group for $R^1$, $R^2$, and $R^3$ which may be substituted has 1 to 10 carbon atoms; said phenyl group for $R^1$, $R^2$ and $R^3$ which may be substituted has 6 to 8 carbon atoms; said alkylene group for (A) has 2 to 4 carbon atoms; said alkylene group for $R^7$ and $R^8$ has 2 to 3 carbon atoms; said alkyl group for $R^4$ and $R^5$ which may be substituted has 1 to 10 carbon atoms; said alkyl group for $R^6$ has 1 to 6 carbon atoms; said alkenyl group for $R^4$ and $R^5$ has 3 to 5 carbon atoms; said aryl group for $R^4$ and $R_5$ has 6 to 8 carbon atoms; said aralkyl group for $R^4$ and $R^5$ has 7 to 10 carbon atoms; said 5- or 6-membered nitrogen-containing heterocyclic ring is a 1-pyrrolidinyl group, a 3-methyl-1-pyrrolidinyl group, a 2-hydroxyethyl-1-pyrrolidinyl group, a 2,5-dimethyl-1-pyrrolidinyl group, a 3-thiazolidinyl group, a 1-pyrrolyl group, a 1-pyrazolyl group, a 1-imidazolyl group, a morpholino group, a piperidino group, a 2,6-dimethylpiperidino group, a 1-piperadinyl group, or a 4-methyl-1-piperadinyl group and said amine base for Z is represented by the general formula (II)

wherein $R^1$ and $R^2$ are the same as defined in general formula (I).

3. A reactive phthalocyanine dye as claimed in claim 1, wherein said phthalocyanine dye is represented by general formula (I-1)

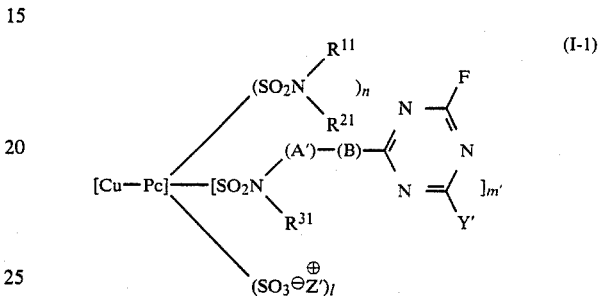

wherein [Cu—Pc] represents a copper phthalocyanine residue; $R^{11}$, $R^{21}$, $R^{31}$, each represents a hydrogen atom, or alkyl group which may be substituted with an alkoxy group, a phenoxy group, a halogen atom, an alkoxycarbonyl group, a cyano group or a tetrahydrofuryl group; (A) represents an alkylene group or a group shown by —$R^{71}$—O—$R^{81}$— (wherein $R^{71}$ and $R^{81}$ each represents a lower alkylene group); (B) represents an oxygen atom or a group shown by —NH—; Y represents a group shown by —$NR^{41}R^{51}$ when (B) represents an oxygen atom (wherein $R^{41}$ and $R^{51}$ each represents a hydrogen atom, alkyl group which may be substituted with an alkoxy group, a phenoxy group, a halogen atom, an alkoxycarbonyl group, a cyano group or a tetrahydrofuryl group, an alkenyl group, a cyclohexyl group, an aryl group, an aralkyl group or, as —$NR^{41}R^{51}$, a 5-membered nitrogen-containing heterocyclic ring formed by bonding $R^{41}$ and $R^{51}$ or Y represents a group shown by —$OR^{61}$ when (B) represents a group shown by —NH— (wherein $R^{61}$ represents a hydrogen atom, or an alkyl group); Z represents an alkali metal atom or alkyl ammonium salt; m represents a real number of 1 to 2.

4. A reactive phthalocyanine dye as claimed in claim 1, wherein said [Pc] represents a copper phthalocyanine residue.

5. A reactive phthalocyanine dye as claimed in claim 1, wherein said $R^3$ represents a hydrogen atom.

6. A reactive phthalocyanine dye as claimed in claim 1, wherein said (A) represents an alkylene group, or a group shown by —$R^7$—O—$R^8$—.

7. A reactive phthalocyanine dye as claimed in claim 1, wherein said X represents a fluorine atom.

8. A reactive phthalocyanine dye as claimed in claim 1, wherein said [Pc] represents a copper phthalocyanine residue, said $R^3$ represents a hydrogen atom, said (A) represents an alkylene group, or a group shown by —$R^7$—O—$R^8$—, and said X represents a fluorine atom.

9. A reactive phthalocyanine dye as claimed in claim 1, wherein said (B) represents a group shown by —NH— and said Y represents a group shown by —OR⁶—.

10. A reactive phthalocyanine dye as claimed in claim 1, wherein $R^1$, $R^2$ and $R^3$ represent an alkyl group having 1 to 10 carbon atoms, a phenyl group having 6 to 8 carbon atoms; (A) represents an alkylene group having 2 to 4 carbon atoms; $R^6$ represents an alkyl group having 1 to 6 carbon atoms; $R^7$ and $R^8$ represent an alkenyl group having 2 to 3 carbon atoms; $R^4$ and $R^5$ represent an alkyl group having 1 to 10 carbon atoms (which alkyl group may be further substituted with an alkoxy group, a phenoxy group, a halogen atom, an alkoxycarbonyl group, a cyano group or a tetrahydrofuryl group), an alkenyl group having 3 to 5 carbon atoms, an aryl group having 6 to 8 carbon atoms, an aralkyl group having 7 to 10 carbon atoms, or a 5- or 6-membered nitrogen-containing heterocyclic ring selected from the group consisting of a 1-pyrrolidinyl group, a 3-methyl-1-pyrrolidinyl group, a 2-hydroxyethyl-1-pyrrolidinyl group, a 2,5-dimethyl-1-pyrrolidinyl group, a 3-thiazolidinyl group, a 1-pyrrolyl group, a 1-pyrazolyl group, a 1-imidazolyl group, a morpholino group, a piperidino group, a 2,6-dimethylpiperidino group, a 1-piperadinyl group, and a 4-methyl-1-piperadinyl group; and Z represents an amine base represented by the general formula (II)

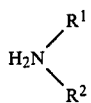
(II)

wherein $R^1$ and $R^2$ are the same as defined in general formula (I).

11. A reactive phthalocyanine dye which is substantially water-insoluble and is represented by general formula (III)

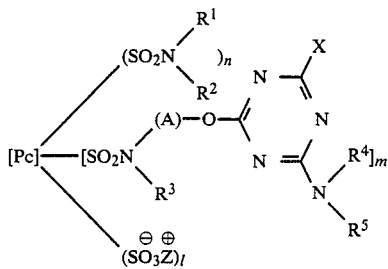
(III)

wherein [Pc] represents a copper phthalocyanine residue or a nickel phthalocyanine residue; $R^1$, $R^2$, and $R^3$ each represents a hydrogen atom, an alkyl group which may be substituted with an alkoxy group, a phenoxy group, a halogen atom, an alkoxycarbonyl group, a cyano group or a tetrahydrofuryl group, a cyclohexyl group, an allyl group, or a phenyl group which may be substituted with a lower alkyl group; (A) represents an alkylene group, a phenylene group, or a group shown by —$R^7$—O—$R^8$— (wherein $R^7$ and $R^8$ each represents an alkylene group); X represents a fluorine atom or a chlorine atom; $R^4$ and $R^5$ each represent a hydrogen atom, an alkyl group which may be substituted with an alkoxy group, a phenoxy group, a halogen atom, an alkoxycarbonyl group, a cyano group or a tetrahydrofuryl group, an alkenyl group, a cyclohexyl group, an aryl group, an aralkyl group, or as —NH⁴R⁵, a 5-membered or 6-membered nitrogen-containing heterocyclic ring formed by bonding $R^4$ and $R^5$; Z represents a metal atom, or an amine base; l represents a real number of 0 to 0.2; m represents a real number of 1 to 4; and n represents a real number of 0 to 2.

12. A reactive phthalocyanine dye as claimed in claim 11, wherein said alkyl group for $R^1$, $R^2$, and $R^3$ which may be substituted has 1 to 10 carbon atoms; said phenyl group for $R^1$, $R^2$ and $R^3$ which may be substituted has 6 to 8 carbon atoms; said alkylene group for (A) has 2 to 4 carbon atoms; said alkylene group for $R^7$ and $R^8$ has 2 to 3 carbon atoms; said alkyl group for $R^4$ and $R^5$ which may be substituted has 1 to 10 carbon atoms; said alkenyl group for $R^4$ and $R^5$ has 3 to 5 carbon atoms; said aryl group for $R^4$ and $R^5$ has 6 to 8 carbon atoms; said aralkyl group for $R^4$ and $R^5$ has 7 to 10 carbon atoms; said 5- or 6 membered nitrogen-containing heterocyclic ring is a 1-pyrrolidinyl group, a 3-methyl-1-pyrrolidinyl group, a 2-hydroxyethyl-1-pyrrolidinyl group, a 2,5-dimethyl-1-pyrrolidinyl group, a 3-thiazolidinyl group, a 1-pyrrolyl group, a 1-pyrazolyl group, a 1-imidazolyl group, a morpholino group, a piperidino group, a 2,6-dimethylpiperidino group, a 1-piperadinyl group, or a 4-methyl-1-piperadinyl group and said amine base for Z is represented by the general formula (II)

(II)

wherein $R^1$ and $R^2$ are the same as defined in general formula (III).

13. A reactive phthalocyanine dye as claimed in claim 11, wherein said phthalocyanine dye is represented by general formula (III-1)

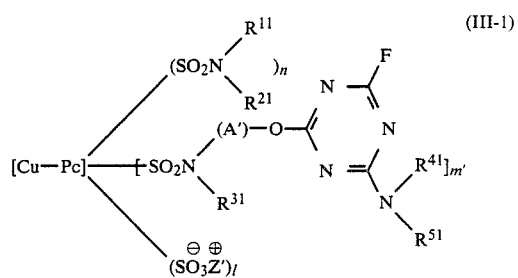
(III-1)

wherein [Cu-Pc] represents a copper phthalocyanine residue; $R^{11}$, $R^{21}$, $R^{31}$, each represents a hydrogen atom, or alkyl group which may be substituted with an alkoxy group, a phenoxy group, a halogen atom, an alkoxycarbonyl group, a cyano group or a tetrahydrofuryl group; (A') represents an alkylene group or a group shown by —$R^{71}$—O—$R^{81}$— (wherein $R^{71}$ and $R^{81}$ each represents a lower alkylene group); $R^{41}$ and $R^{51}$ each represents a hydrogen atom, alkyl group which may be substituted with an alkoxy group, a phenoxy group, a halogen atom, an alkoxycarbonyl group, a cyano group or a tetrahydrofuryl group, an alkenyl group, a cyclohexyl group, an aryl group, an aralkyl group or, as —NR⁴¹R⁵¹, a 5-membered nitrogen-containing heterocyclic ring formed by bonding $R^{41}$ and $R^{51}$; Z' represents an alkali metal atom or alkyl amonium salt; m' represents a real number of 1 to 2.

14. A reactive phthalocyanine dye as claimed in claim 11, wherein said [Pc] represents a copper phthalocyanine residue.

15. A reactive phthalocyanine dye as claimed in claim 11, wherein said $R^3$ represents a hydrogen atom.

16. A reactive phthalocyanine dye as claimed in claim 11, wherein said (A) represents an alkylene group, or a group shown by $-R^7-O-R^8-$.

17. A reactive phthalocyanine dye as claimed in claim 11, wherein said X represents a fluorine atom.

18. A reactive phthalocyanine dye as claimed in claim 11, wherein said [Pc] represents a copper phthalocyanine residue, said $R^3$ represents a hydrogen atom, said (A) represents an alkylene group, or a group shown by $-R^7-O-R^8$, and said X represents a fluorine atom.

19. A reactive phthalocyanine dye as claimed in claim 11, wherein said phthalocyanine dye is represented by general formula (III-2)

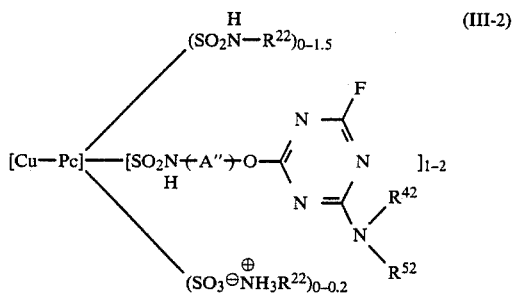

wherein [Cu-Pc] represents a copper phthalocyanine residue; $R^{22}$ represents an alkyl group which may be substituted with an alkoxy group, a phenoxy group, a halogen atom, an alkoxycarbonyl group, a cyano group or a tetrahydrofuryl group; (A") represents an alkylene group; $R^{42}$ and $R^{52}$ each represents a hydrogen atom, or an alkyl group which may be substituted with an alkoxy group, a phenoxy group, a halogen atom, an alkoxycarbonyl group, a cyano group or a tetrahydrofuryl group.

20. A reactive phthalocyanine dye as claimed in claim 11, wherein $R^1$, $R^2$ and $R^3$ represent an alkyl group having 1 to 10 carbon atoms, a phenyl group having 6 to 8 carbon atoms; (A) represents an alkylene group having 2 to 4 carbon atoms; $R^7$ and $R^8$ represent an alkenyl group having 2 to 3 carbon atoms; $R^4$ and $R^5$ represent an alkyl group having 1 to 10 carbon atoms (which alkyl group may be further substituted with an alkoxy group, a phenoxy group, a halogen atom, an alkoxycarbonyl group, a cyano group or a tetrahydrofuryl group), an alkenyl group having 3 to 5 carbon atoms, an aryl group having 6 to 8 carbon atoms, an aralkyl group having 7 to 10 carbon atoms, or a 5- or 6-membered nitrogen-containing heterocyclic ring selected from the group consisting of a 1-pyrrolidinyl group, a 3-methyl-1-pyrrolidinyl group, a 2-hydroxyethyl-1-pyrrolidinyl group, a 2,5-dimethyl-1-pyrrolidinyl group, a 3-thiazolidinyl group, a 1-pyrrolyl group, a 1-pyrazolyl group, a 1-imidazolyl group, a morpholino group, a piperidino group, a 2,6-dimethylpiperidino group, a 1-piperadinyl group, and a 4-methyl-1-piperadinyl group; and Z represents an amine base represented by the general formula

wherein $R^1$ and $R^2$ are the same as defined in general formula (III).

* * * * *